United States Patent [19]

Comerci et al.

[11] Patent Number: 5,352,854
[45] Date of Patent: Oct. 4, 1994

[54] ELECTRICAL WIRE STRAIN RELIEF AND WIRE MANAGEMENT SYSTEM

[75] Inventors: Joseph D. Comerci, Elmhurst; Mark M. Data, Bolingbrook, both of Ill.

[73] Assignee: Molex Incorporated, Lisle, Ill.

[21] Appl. No.: 1,440

[22] Filed: Jan. 7, 1993

[51] Int. Cl.⁵ ............................................ H02G 3/08
[52] U.S. Cl. ................................. 174/65 R; 174/53; 174/175; 439/449
[58] Field of Search ............... 174/53, 65 R, 168, 174, 174/175; 220/3.2; 439/449, 456, 457, 458

[56] References Cited

U.S. PATENT DOCUMENTS

| | | | |
|---|---|---|---|
| 4,224,465 | 9/1980 | Ruzic | 174/135 |
| 4,244,483 | 1/1981 | Bauer et al. | 220/3.2 |
| 4,910,362 | 3/1990 | Kinner | 174/135 |
| 4,984,982 | 1/1991 | Brownlie et al. | 439/131 |

FOREIGN PATENT DOCUMENTS

| | | | |
|---|---|---|---|
| 66853 | 5/1948 | Denmark | 174/168 |
| 125008 | 5/1949 | Sweden | 174/168 |

*Primary Examiner*—Leo P. Picard
*Assistant Examiner*—David Tone
*Attorney, Agent, or Firm*—Stephen Z. Weiss

[57] ABSTRACT

An electrical wire strain relief and wire management system is integrally molded with a wall of an electrical receptacle housing to hold up to two electrical wires against the receptacle housing wall. A pair of side-by-side longitudinal channels extend along the wall of the receptacle housing for receiving the electrical wires. Each channel has an outer wall, with an intermediate wall shared by both channels. Each outer wall includes an inwardly directed ledge overhanging its respective channel. The shared intermediate wall includes common ledges overhanging both channels at a location spaced longitudinally of the channels from the inwardly directed ledges. The transverse distance between the ledges and the common ledges is less than the cross-dimensions of the wires so that the inwardly directed ledges and the common ledges define serpentine passages for insertion of the wires into the channels.

8 Claims, 1 Drawing Sheet

ELECTRICAL WIRE STRAIN RELIEF AND WIRE MANAGEMENT SYSTEM

FIELD OF THE INVENTION

This invention generally relates to the art of electrical apparatus and, particularly, to a system for providing strain relief and management of electrical wires on devices such as electrical receptacles.

BACKGROUND OF THE INVENTION

Many electrical connectors, appliances, receptacles and other devices include means for providing strain relief and for managing electrical wires entering or exiting from the devices. The systems not only provide strain relief for the wires but also provide means for preventing the wires from becoming entangled and to secure the wires in a managed condition, usually against housings or other portions of the devices.

For instance, an electrical receptacle may have an interior cavity within which the wires are terminated or connected to other electrical components. The wires enter/exit the receptacle through an opening in the receptacle housing, and it is desirable that the wires are managed or secured in an untidy or secure condition, usually snugly against the receptacle housing.

When such wire strain relief and management systems are adapted for accommodating more than one electrical wire, the systems most often are unduly complicated and simply are duplicative of structure commonly employed to manage a single wire. This causes problems in use, manufacture and cost. The present invention is directed to providing a very simple strain relief and management system for a pair of electrical wires extending through a housing of an electrical device, such as an electrical receptacle, which is easy to use, simple to manufacture and cost effective.

SUMMARY OF THE INVENTION

An object, therefore, of the invention is to provide a new and improved electrical wire strain relief and wire management system of the character described.

In the exemplary embodiment of the invention, the system is structured to be integrally molded with a wall of an electrical receptacle housing to hold up to two electrical wires against the wall of the housing. The system includes a pair of side-by-side longitudinal channels extending along the wall of the receptacle housing for receiving the electrical wires. Each channel has an outer wall, with an intermediate wall chaired by both channels. Each outer wall includes an inwardly directed ledge overhanging its respective channel. The shared intermediate wall has common ledge means overhanging both channels at a location spaced longitudinally of the channels from the inwardly directed ledges. The transverse distance between the ledges and the intermediate ledge means are less than the cross-dimensions of the wires, whereby the inwardly directed ledges and the ledge means define serpentine passages for insertion of the wires into the channels.

In the preferred embodiment of the invention, the channels have generally equal lengths. The inwardly directed ledges on the outer walls of the channels are located near first adjacent ends of the channels, and the ledge means on the shared intermediate wall are located near second opposite ends of the channels. An opening in the receptacle wall is provided near one end of the channels and through which the wires can project from inside the receptacle housing for insertion into the channels.

Another feature of the invention is directed to the provision of a lip projecting from an end of the outer wall of at least one of the channels. The lip projects in the direction of the outer wall and is spaced outwardly from the receptacle housing wall. Therefore, a wire positioned in the one channel can be bent perpendicular to the channel and lodged under the lip to reduce the possibility that the wire can be removed from the channel and the overhanging ledge and ledge means.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENTS

Figure 1:
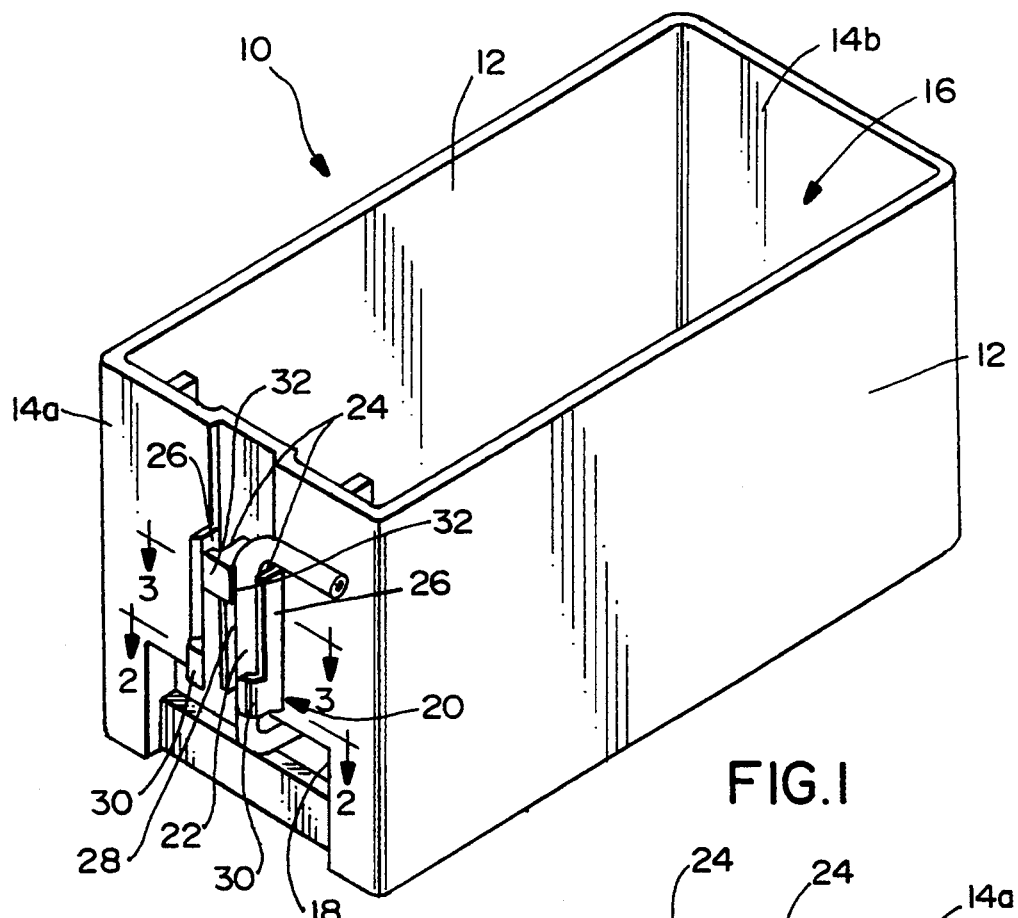
FIG. 1 is a perspective view of an electrical receptacle embodying the wire strain relief and wire management system of the invention.

Referring to the drawings in greater detail, and first to FIG. 1, the invention is embodied in an electrical receptacle housing, generally designated 10, which includes a pair of side walls 12, a pair of end walls 14a and 14b and a bottom wall which is not visible in the drawing. The walls define an interior cavity, as at 16, in which can be mounted various electrical components to which electrical wires are terminated or interconnected, the wires entering/exiting the housing through an opening 18 in end wall 14a. The receptacle housing is unitarily molded of dielectric material, such as plastic or the like, and the electrical wire strain relief and wire management system of the invention, generally designated 20, is molded integrally on the outside of end wall 14a. It should be understood that, while the invention is illustrated as embodied in an electrical receptacle, such as receptacle housing 10, the invention is not to be considered as limited to such an application, because the invention is equally applicable for embodiment in a wide variety of electrical devices.

Figure 2:
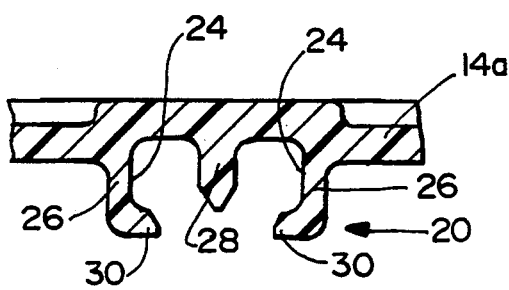
FIG. 2 is a horizontal section taken generally along line 2—2 of FIG. 1.
Figure 3:
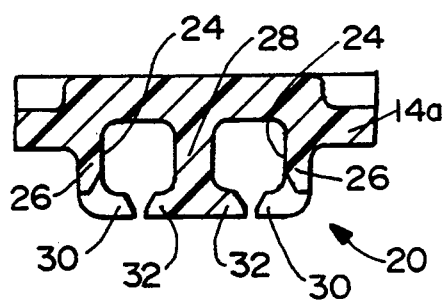
FIG. 3 is a horizontal section taken generally along line 3—3 of FIG. 1.

More particularly, referring to FIGS. 2 and 3 in conjunction with FIG. 1, the wire strain relief and wire management system 20 of the invention is designed to hold up to two electrical wires 22 (FIG. 1) against end wall 14a of receptacle housing 10. Only one electrical wire is shown in FIG. 1 to avoid cluttering the illustration. The system provides a pair of side-by-side channels 24 extending along wall 14a of the housing for receiving the electrical wires. The channels are of equal lengths, and adjacent open ends of the channels are located near opening 18 in the receptacle housing so that the wires can project through the opening and be inserted directly into the channels, as is seen clearly by wire 22 in FIG. 1.

More particularly, each channel 24 is defined by an outer wall 26, with an intermediate wall 28 shared by both channels to provide a compact structure. Each outer wall includes an inwardly directed ledge 30 (see FIG. 2) at the ends of the channels near opening 18 in end wall 14a of the receptacle housing. The shared intermediate wall 28 includes ledge means defining outwardly directed ledge portions 32 overhanging both channels at the opposite ends thereof, i.e. remote from opening 18.

It is contemplated that the transverse distance (i.e. perpendicular to the longitudinal direction of channels 24) between ledges 30 and ledge means 32 of each respective channel be less than the cross-dimensions of the wires 22 which are inserted into the channels. Therefore, the inwardly directed ledges and the outwardly directed edge means defined serpentine passages for insertion of the wires into the channels. In other words, although channels 24 are dimensioned to accept the electrical wires, the overhanging ledges partially encapsulate the wires within the channels to provide both strain relief and management for the wires in a tidy and secure side-by-side array snugly against the outside of the receptacle housing.

Figure 4:
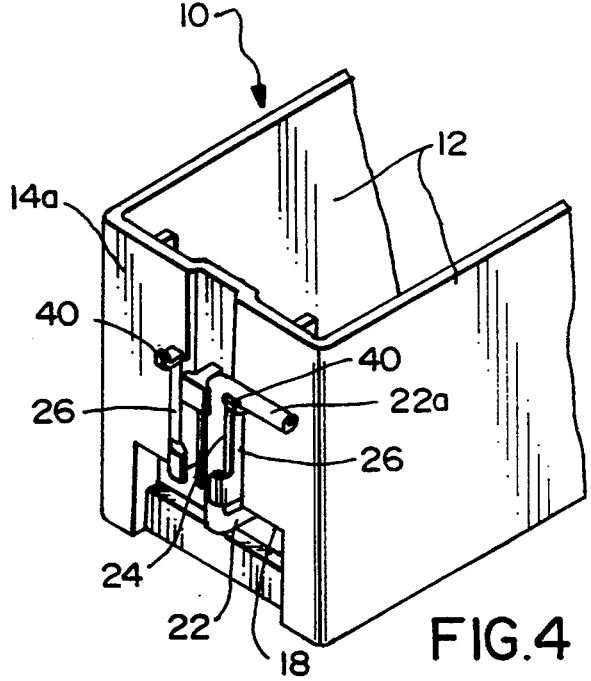
FIG. 4 is a fragmented perspective view of one end of an electrical receptacle embodying an alternate form of the invention.

FIG. 4 shows an alternate embodiment of the invention which incorporates an additional wire management feature to facilitate holding the electrical wires against the receptacle housing wall in right-angled conditions as shown by the wire in both FIGS. 1 and 4. More particularly, an integrally molded lip 40 projects from the end of each outer wall 26 of the respective channels. Each lip projects in the direction of the outer walls and is spaced outwardly from end wall 14a of receptacle housing 10 a distance for snugly receiving a right-angled bent portion 22a of the respective electrical wire 22. As can be seen by the one wire in FIG. 4, the wire is bent, as at 22a, perpendicular to its respective channel 24 so that the bent portion of the wire is maintained snugly against the outside of the housing. By lodging the wires under lips 40, the possibility that the wires can be removed from their respective channels and overhanging ledges and ledge means is reduced. In other words, while lips 40 provide an additional wire management feature, the lips enhance the strain relief function of the overall system.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In an electrical wire strain relief and wire management system integrally molded with a wall of an electrical receptacle housing to hold up to two electrical wires against the wall of the receptacle housing, wherein the improvement comprises a pair of side-by-side channels extending along the wall of the receptacle housing for receiving the electrical wires, each channel having an outer wall, with an intermediate wall shared by both channels, each outer wall including an inwardly directed ledge overhanging its respective channel, and the shared intermediate wall including common ledge means overhanging both channels at a location spaced longitudinally of the channels from the inwardly directed ledges, the transverse distance between the ledges and the ledge means being less than the cross-dimensions of the wires whereby the inwardly directed ledges and the ledge means define serpentine passages for insertion of the wires into the channels.

2. In an electrical wire strain relief and wire management system as set forth in claim 1, wherein the channels have generally equal lengths, the inwardly directed ledges being located near first adjacent ends of the channels, and the ledge means being located near second opposite ends of the channels.

3. In an electrical wire strain relief and wire management system as set forth in claim 1, including a lip projecting from an end of the outer wall of at least one of the channels in the direction of the outer wall and spaced outwardly of the receptacle wall, whereby a wire positioned in the one channel can be bent perpendicular to the channel and lodged under the lip to reduce the possibility that the wire can be removed from the channel and its overhanging ledge and the ledge means.

4. In an electrical wire strain relief and wire management system as set forth in claim 1, including an opening in the receptacle wall near one end of the channels and through which the wires can project from inside the receptacle housing for insertion into the channels.

5. In an electrical wire strain relief and wire management system as set forth in claim 4, wherein the channels have generally equal lengths, the inwardly directed ledges being located near first adjacent ends of the channels, and the ledge means being located near second opposite ends of the channels.

6. In an electrical wire strain relief and wire management system as set forth in claim 4, including a lip projecting from an opposite end of the outer wall of at least one of the channels in the direction of the outer wall and spaced outwardly of the receptacle wall, whereby a wire positioned in the one channel can be bent perpendicular to the channel and lodged under the lip to reduce the possibility that the wire can be removed from the channel and its overhanging ledge and the ledge means.

7. In an electrical wire strain relief and wire management system integrally molded with a wall of an electrical receptacle housing to hold up to two electrical wires against the wall of the receptacle housing, the housing having an opening through which the wire can project from inside the receptacle housing, wherein the improvement comprises a pair of side-by-side longitudinal channels extending along the wall of the receptacle housing from said opening for receiving the electrical wires, each channel having an outer wall, with an intermediate wall shared by both channels, the channels having generally equal lengths and each outer wall including an inwardly directed ledge overhanging its respective channel near first adjacent ends of the channels, the shared intermediate wall having ledge means overhanging both channels near second opposite ends of the channels, the transverse distance between the ledges and the ledge means being less than the cross-dimensions of the wires so that the inwardly directed ledges and the ledge means define serpentine passages for insertion of the wires into the channels, and a lip projecting from an end of the outer wall of at least one of the channels in the direction of the outer wall and spaced outwardly of the receptacle wall, whereby a wire positioned in the one channel can be bent perpendicular to the channel and lodged under the lip to reduce the possibility that the wire can be removed from the channel and its overhanging ledge and the ledge means.

8. In an electrical wire strain relief and wire management system for an electrical device to hold up to two electrical wires against a wall of the device, wherein the improvement comprises a pair of channels extending along the wall for receiving the electrical wires, each channel having an outer wall, with an intermediate wall shared by both channels, each outer wall including an inwardly directed ledge overhanging its respective channel, and the shared intermediate wall having ledge means overhanging both channels at a location spaced longitudinally of the channels from the inwardly directed ledges, the transverse distance between the ledges and the ledge means being less than the cross-dimensions of the wires to define serpentine passages for insertion of the wires into the channels.

* * * * *